United States Patent [19]

Ferguson

[11] Patent Number: 4,971,336
[45] Date of Patent: Nov. 20, 1990

[54] ENHANCED PERFORMANCE BRUSH SEALS

[75] Inventor: John G. Ferguson, Stroud, England

[73] Assignee: Rolls-Royce plc., London, England

[21] Appl. No.: 443,814

[22] Filed: Nov. 29, 1989

Related U.S. Application Data

[63] Continuation of Ser. No. 256,457, Oct. 12, 1988, abandoned.

[30] Foreign Application Priority Data

Nov. 13, 1987 [GB] United Kingdom ............... 8726614

[51] Int. Cl.$^5$ .................. F16J 15/447; F01D 11/02
[52] U.S. Cl. ................................ 277/53; 415/174.5
[58] Field of Search ............... 415/174.5; 277/53–57

[56] References Cited

U.S. PATENT DOCUMENTS

| 885,032 | 4/1908 | De Ferranti .................. 277/53 X |
| 3,917,150 | 11/1975 | Ferguson et al. .............. 277/53 X |
| 4,202,554 | 5/1980 | Snell ............................... 277/53 |
| 4,209,268 | 6/1980 | Fujiwara et al. ............... 277/53 X |
| 4,600,202 | 7/1986 | Schaeffler et al. ............. 277/53 |

FOREIGN PATENT DOCUMENTS

| 2938484 | 3/1981 | Fed. Rep. of Germany ...... 277/53 |
| 421302 | 5/1947 | Italy ........................... 277/53 |
| 489822 | 8/1938 | United Kingdom ........... 277/53 |
| 839731 | 6/1960 | United Kingdom ........... 277/53 |
| 1450553 | 9/1976 | United Kingdom . |
| 2021209 | 11/1979 | United Kingdom ........... 277/53 |

*Primary Examiner*—William A. Cuchlinski, Jr.
*Assistant Examiner*—Daniel G. DePumpo
*Attorney, Agent, or Firm*—Oliff & Berridge

[57] ABSTRACT

One problem associated with presently known brush seals (10) used in gas turbine engines is their limited ability to cope with excessive radial inteference due for example to excessive thermal or centrifugal growth of the component against which they seal (18). The bristles (16) of the seal tend to spread axially and may assume a permanently deformed shape. In either case, the performance and life of the seal (10) is adversely affected. This invention overcomes the above problem by providing a brush seal which comprises a series of segments (20) of bristle material (16) which are circumferentially spaced from each other by a predetermined amount to form a gap (G). The gap (G) allows a greater degree of radial and circumferential deflection of the bristles (16) within the plane of the seal (10) before the bristles (16) are forced to move axially. It is contemplated that good design could avoid axial displacement altogether.

10 Claims, 1 Drawing Sheet

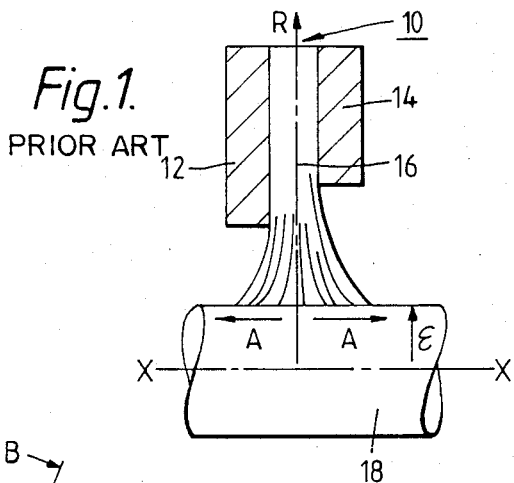
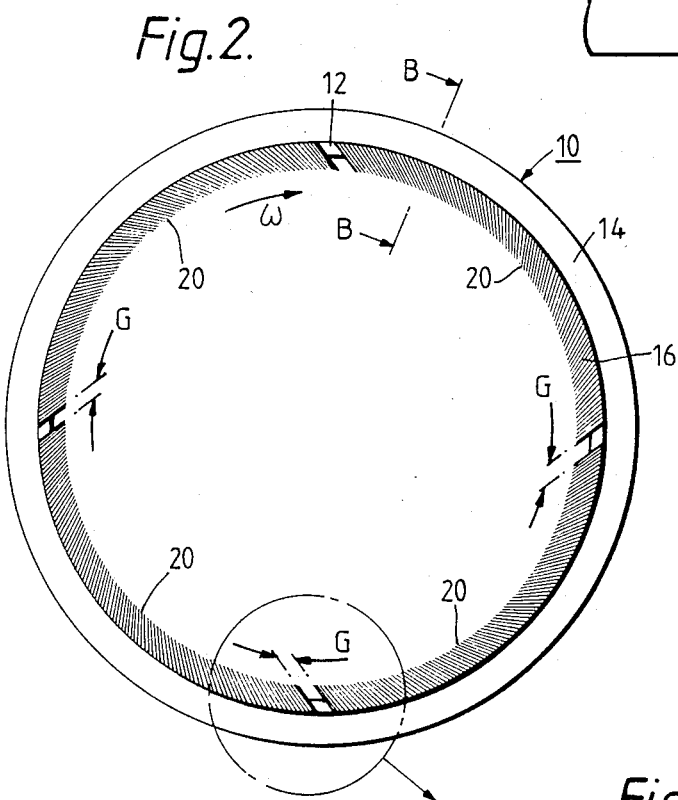
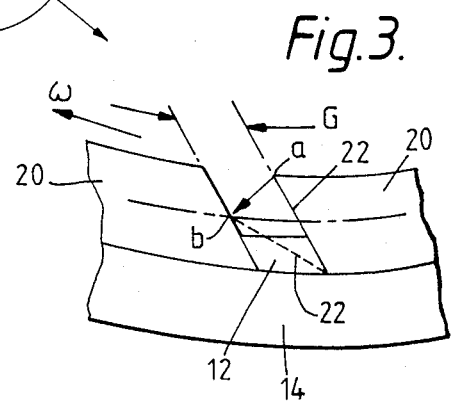

ENHANCED PERFORMANCE BRUSH SEALS

This is a Continuation of application Ser. No. 07/256,457 filed Oct. 12, 1988 now abandoned.

This invention relates to brush seals and particularly to brush seals capable of accommodating significantly greater radial interference than presently known brush seals.

An example of the type of brush seal presently known is described and claimed in our UK Patent No. 1450,553. Such a seal comprises a pair of side-plates between which a plurality of brush bristles are held and from which they project freely from one or other of the edges at approximately 45° to the tangent of the side-plates. The bristles are integrally joined to the side-plates by welding or brazing or any other suitable method.

Brush seals act to seal the gap between two relatively rotating components. One well known application of such a seal is in a gas turbine engine where the seal is mounted in one member and the bristles contact a second member, such as for example a shaft. Radial growth of the shaft, due for example to temperature changes or centrifugal forces, is normally accommodated by the bristles bending. Under normal operating conditions the bristles bend within the plane of the seal. However, when excessive radial interference between the shaft and the seal is experienced the bristles tend to splay out and move axially along the shaft. The efficiency of the seal is temporarily reduced by the bristles axial movement and the bristles can take up a permanently deformed shape which is detrimental to the long term efficiency and life of the seal.

It is an object of the present invention to provide a brush seal which is capable of reducing and possible eliminating the disadvantages of presently known brush seals by providing a brush seal which is capable of accommodating significantly greater radial interference without significant losses in performance.

Accordingly, the present invention will now be more accurately described by way of example only with reference to the accompanying drawings, in which:

FIG. 1 is a cross sectional view of a presently known brush seal.

FIG. 2 is a scheme representation of a brush seal incorporating the present invention.

FIG. 3 is an enlarged view of a portion of the seal shown in FIG. 2.

Referring briefly to FIG. 1, a brush seal (10) generally comprises a pair of axially spaced apart annular sideplates (12,14) and a plurality of tightly packed bristles (16) which are sandwiched therebetween. The bristles (16) generally extend radially from the sideplates and their free ends act on the component against which they seal. In FIG. 1, the bristles (16) are shown extending radially inwardly and acting on a shaft (18). Radial expansion (E) of the shaft beyond that which the seal (10) is designed to accommodate forces the bristles (16) to spread axially along the shaft (18) in the direction of arrows (A—A).

It will be appreciated that as the bristles spread axially the efficiency of the seal reduces dramatically. In some instances permanent deformation of the bristles (16) takes place which has a dramatic effect on the performance of the seal under normal operating conditions and reduces the seals life considerably.

Referring now to FIGS. 2 and 3, the present invention proposes that the seal (10) be made from two or more segments (20) of tightly packed bristle material (16) which are circumferentially spaced apart from each other by a predetermined amount to form a gap (G). The gap (G) best seen in FIG. 3 allows the bristles (one of which is shown at 22) of each segment (20) significantly greater freedom of movement within the plane of the seal (10). The tip of sample bristle (22) for example moves from position (a) to a radially and circumferentially displaced position (b). It will be appreciated that the gap (G) will allow each of the bristles (16) to spread out circumferentially and radially to a greater degree than before. Axial deformation of the bristles (16) is reduced and possibly eliminated.

It will be further appreciated that the gap (G) will provide a leakage path for air to pass from one side of the seal (10) to the other. This leakage rate can be either exploited as part of a controlled leakage for pressurisation purposes or reduced by arranging a second bank of segments (20) which are circumferentially spaced from the first bank. Air escaping through the first gap (G) will be confronted by a densely packed segment of bristles (20) through which it is difficult to pass.

I claim:

1. A brush seal comprising:
   a pair of sideplates, spaced in an axial direction from each other by a predetermined amount;
   at least two arcuate segments of tightly packed bristles, each segment being sandwiched between said side plates and having free ends projecting therefrom; wherein
   the improvement comprises spacing the segments from each other in a circumferential direction by a predetermined amount thereby to define a gap, at least a portion of the gap being disposed adjacent the free ends of bristles, for receiving the free ends of deflected bristles to substantially reduce axial splaying of the bristles.

2. A brush seal according to claim 1 in which the side plates are annular in form and the free ends of the bristles project radially therefrom.

3. A brush seal according to claim 2 in which the side plates and the bristle segments extend in a radial direction thereby to define the plane of the seal and in which the free ends of the bristles project from the side plates at an angle to the radius of the seal.

4. A brush seal according to claim 2 in which the bristles project radially inwardly from the annular side plates and act on the radially outer surface of a shaft to effect a seal therebetween.

5. A brush seal according to claim 3 in which the bristles project radially inwardly from the annular sideplates and act on the radially outer surface of a shaft to effect a seal therebetween.

6. A brush seal as in claim 1 wherein the gap extends to a region between the side plates.

7. A brush seal comprising:
   a pair of side plates, spaced in an axial direction from each other by a predetermined amount;
   at least two axially aligned segments of tightly packed bristles, each segment being sandwiched between said side plates and having free ends projecting therefrom; wherein
   the improvement comprises gap means defining a space of predetermined extent between the free ends of adjacent bristles of the segments, for receiving the free ends of deflected bristles to substantially reduce axial splaying of the bristles, said gap means further defining a fluid flow passage through the seal.

8. A brush seal comprising:
- a pair of side plates spaced axially from each other by a predetermined amount;
- at least two arcuate segments of tightly packed bristles, each segment being sandwiched between said side plates and having free ends projecting therefrom; and
- a gap of substantially uniform circumferential extent between the segments and extending from the free ends of the bristles to at least one of the sideplates, for receiving the free ends of deflected bristles to substantially reduce axial splaying of the bristles.

9. A seal as in claim 8, wherein the side plates are annular in form and the free ends of the bristles project radially inwardly therefrom.

10. A brush seal according to claim 9 wherein the side plates and bristle segments extend in a radial direction thereby to define the plane of the seal and in which the free ends of the bristles project radially inwardly from the side plates at an angle to the radius of the seal.

* * * * *